Nov. 22, 1960 L. O. PARKER 2,960,984
PREFABRICATED CASTS OR MOLD AND METHOD FOR MAKING THE SAME
Filed Dec. 9, 1952 4 Sheets-Sheet 1

INVENTOR.
LEON O. PARKER
BY
ATTORNEY

Nov. 22, 1960 L. O. PARKER 2,960,984
PREFABRICATED CASTS OR MOLD AND METHOD FOR MAKING THE SAME
Filed Dec. 9, 1952 4 Sheets-Sheet 2
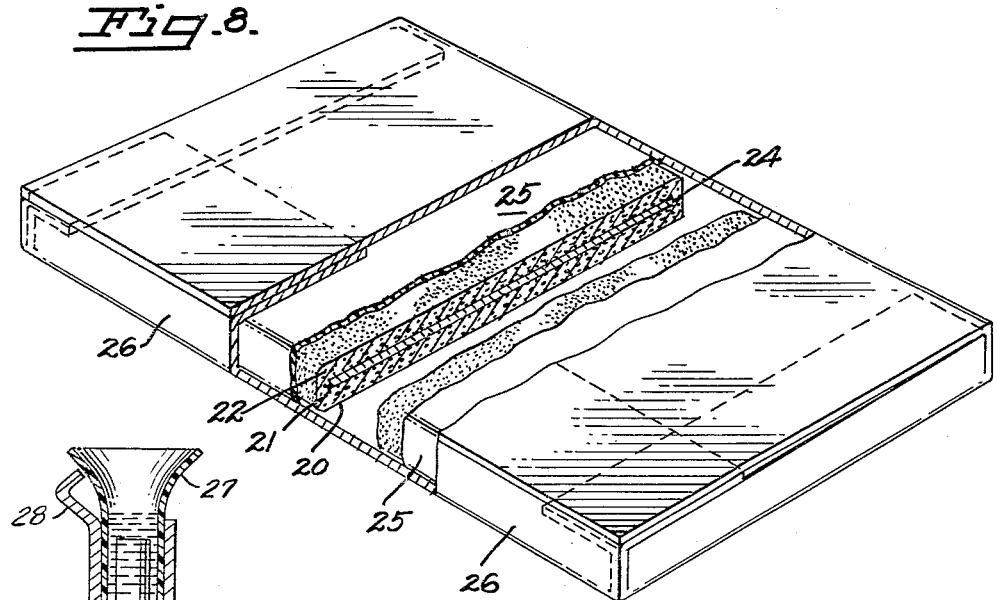
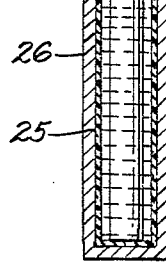
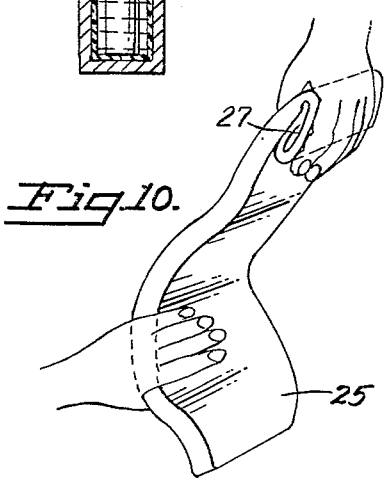
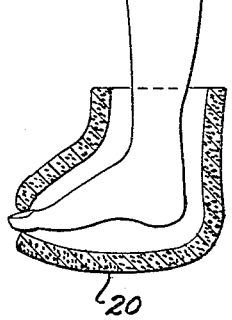
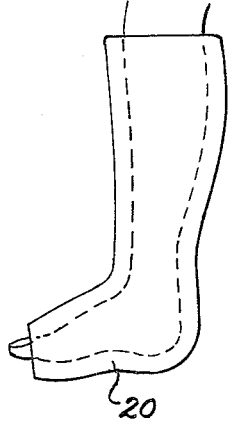
INVENTOR.
LEON O. PARKER
BY
ATTORNEY Nov. 22, 1960     L. O. PARKER     2,960,984
PREFABRICATED CASTS OR MOLD AND METHOD FOR MAKING THE SAME
Filed Dec. 9, 1952     4 Sheets-Sheet 3

INVENTOR.
LEON O. PARKER
BY
ATTORNEY

Nov. 22, 1960  L. O. PARKER  2,960,984
PREFABRICATED CASTS OR MOLD AND METHOD FOR MAKING THE SAME
Filed Dec. 9, 1952  4 Sheets-Sheet 4
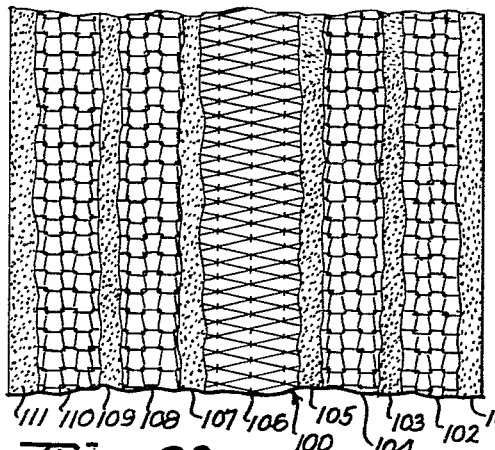
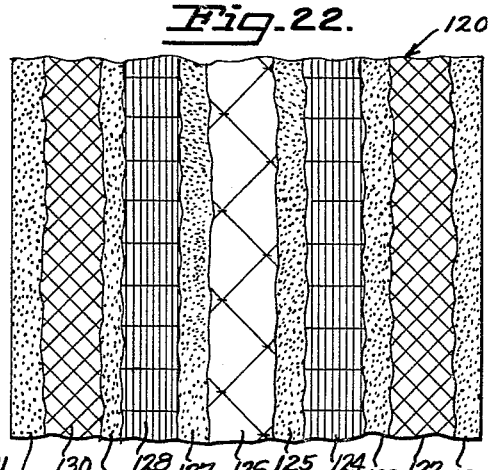
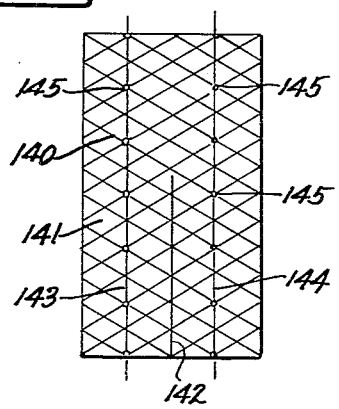
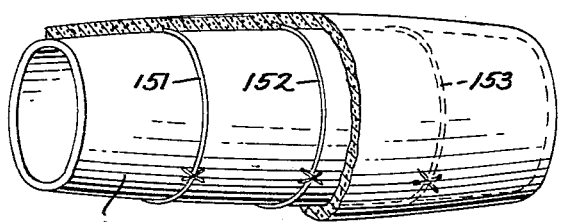
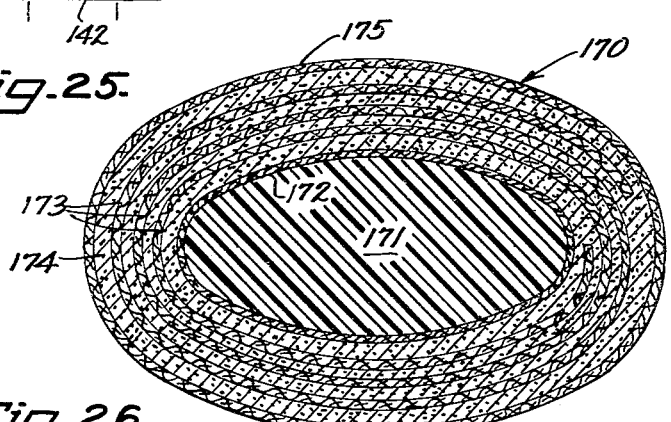
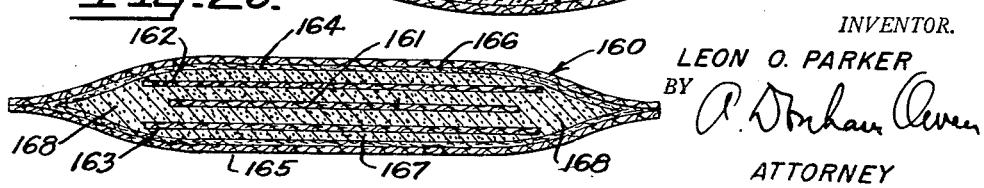
INVENTOR.
LEON O. PARKER
BY
ATTORNEY United States Patent Office 2,960,984
Patented Nov. 22, 1960

2,960,984

PREFABRICATED CASTS OR MOLD AND METHOD FOR MAKING THE SAME

Leon O. Parker, San Francisco, Calif., assignor to San Francisco Research Corporation, San Francisco, Calif., a corporation of California Filed Dec. 9, 1952, Ser. No. 325,001

48 Claims. (Cl. 128—91)

This invention relates to improvements in the art of making and applying casts and molds, and to an improved prefabricated cast or mold requiring only the addition of liquid to make it ready for application. This application is a continuation-in-part of Serial No. 248,065, filed September 24, 1951, now abandoned.

My invention solves many problems that have arisen in the art of making casts and molds, where for many years it has been the custom to build the cast or mold up piece by piece from strips or rolls of woven cloth impregnated with wet plaster-of-Paris. The problems occurred whether or not the plaster was bound to the cloth before it was wet and whether the plaster was distributed through the cloth in a dry state or in a semi-fluid state.

One basic difficulty with the prior art casts and molds was the great variation in quality obtained by different operators. Only highly skilled operators could make casts uniform in thickness and strength, join them smoothly, and fit the inner surface smoothly on the patient. Casts made by less skilled operators tended to be too thick or too thin and too rough along the inner surface, and were therefore dangerous to the patients. My invention solves this basic problem by providing a standardized prefabricated article that, upon the simple addition of liquid, can be quickly made into a cast which requires relatively little skill to apply and which, when applied, is uniform in thickness and fits snugly and smoothly on the patient.

The prior art also found it difficult to control the amount of water in the plaster. Excess water prevented the casts from drying properly, so that they often cracked or became bent out of shape. If there were not enough water, the plaster could not be applied smoothly, and some of the plaster would not set; so the cast would be weakened. Because the prior art went by guesswork and "feel," it provided no way of securing uniform wetting. My invention solves this problem by providing for the addition of exactly the right amount of liquid to the prefabricated cast, and by providing a flexible waterproof container in which the liquid may be added to the prefabricated cast and mixed with it.

Another problem with prior art casts was the length of time it took to apply them, because they had to be built up piece by piece. By prolonging the surgical time and in many cases also prolonging the time of anaesthesia, the surgical danger was increased. The prior art methods were especially exasperating with battlefield casualties who had to be treated quickly, under the conditions prevailing near the front lines, in order to save as many wounded men's lives as possible. My invention solves this problem by making it possible to provide a relatively small number of standardized prefabricated articles that can be moistened and then applied to any portion of the body, to produce very quickly a cast with great internal and external smoothness and uniformity of thickness.

The unpadded edges and inner surfaces of prior art surgical casts were likely to injure the patients. When a body member became swollen along the edge of a cast, the skin was pressed up against hard, rough, and sharp edges and was often lacerated, especially if the body member was moved about. The skin was often damaged in spite of considerable effort to prevent pressure and to smooth the edges of the cast. My invention solves this problem by providing a cast having soft padded edges and other interior surfaces.

The invention that solved these problems is a prefabricated or ready-made article that may be put on as a cast after liquid has been added. Dry plaster-of-Paris, or other cast-forming material, is held by a fabric skeleton of a type that can be stretched and contracted to fit different configurations after the proper liquid has been added. The article may be tubular, or flat, or some other shape, and it may be ready-made to fit over or around a limb or other body portion to which it is to be applied. Being stretchable and contractable, the article need be prefabricated to only an approximate fit, for it can be conformed at the time of application to get an exact fit. The cast may be padded interiorly and at the edges, this padding also being conformable to the body member along with the remainder of the cast.

Other advantages and additional features of my invention will appear from the following illustrative description and accompanying drawings, presented in accordance with United States Revised Statutes, section 4888. It is not intended to limit the invention to the illustrative details, the scope of the invention being defined by the appended claims.

In the drawings:

Fig. 8 is a view in perspective and partly in section of a packaged prefabricated tubular cast, with portions broken away to show the structure.

Fig. 9 is a view in elevation and in section showing how liquid may be added to the package of Fig. 8. The package has been opened at one end and liquid has been placed inside the inner waterproof container, wetting the prefabricated cast. The rigid outer container prevents the water from distorting the flexible inner container and the cast.

Fig. 10 is a view in perspective showing the outer container removed from around the inner container of Fig. 9 after the water has soaked into the prefabricated cast. The cast is being "worked" by hand while it is still inside the flexible inner container.

Fig. 11 is a view in elevation and partly in section showing the cast of Fig. 10 removed from the inner container and being applied around a leg. The cast has been stretched in diameter to go around the foot and other wide places in the leg, and its length has been thereby shortened.

Fig. 12 is a view in elevation of the cast of Fig. 11 after application, when it has been stretched in length, thereby reducing it in diameter and conforming it to fit the leg.

Figure 13:
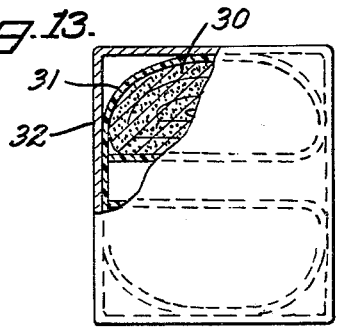

Fig. 13 is a view in elevation and partly in section of a modified form of packaged tubular cast which is rolled up like a stocking, so that it can be put around one end of a limb and unrolled therearound.

Figure 14:
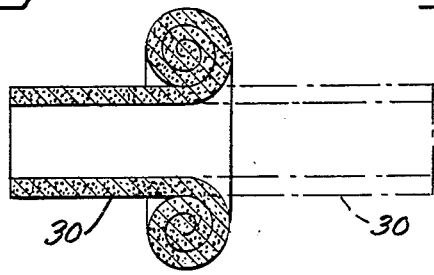

Fig. 14 is a view in elevation showing the cast of Fig. 13 removed from its package and unrolled part way after being wet, its fully unrolled position being indicated by the dot-dash lines.

Figure 15:
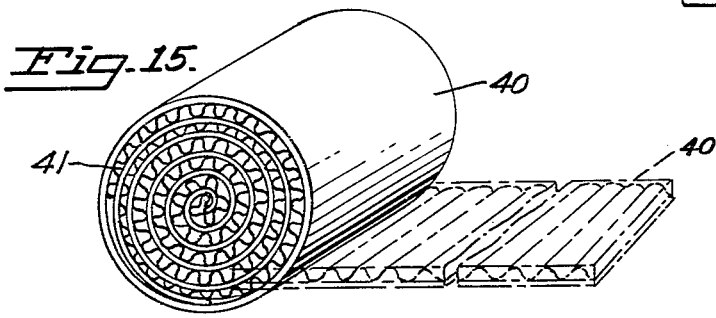

Fig. 15 is a view in perspective of a rolled non-tubular cast incorporating the principles of the invention, the outline of its shape when unrolled being indicated by the dot-dash-lines.

Figure 16:
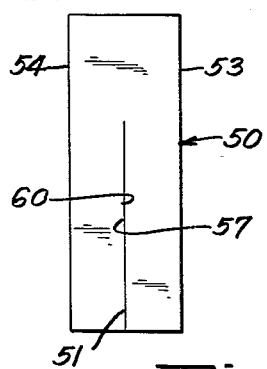

Fig. 16 is a plan view of a unitary prefabricated cast adapted to cover both legs and a portion of the body of a patient.

Figure 17:
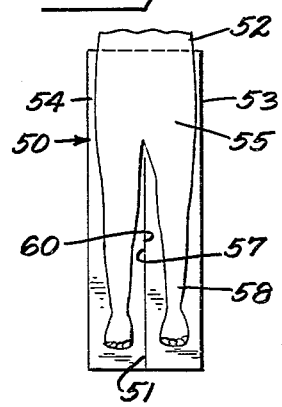

Fig. 17 is a plan view, somewhat diagrammatic in nature, showing a portion of the body of a patient placed on the cast of Fig. 16.

Figure 18:
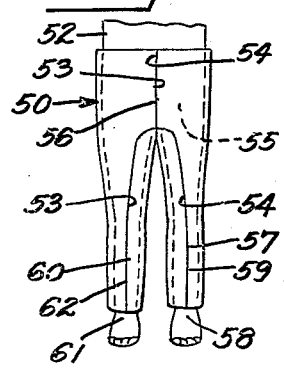

Fig. 18 is a plan view showing the cast of Fig. 16 fully applied around the body portion of patient, with its side edges joined to encircle the body and each leg.

Figure 19:
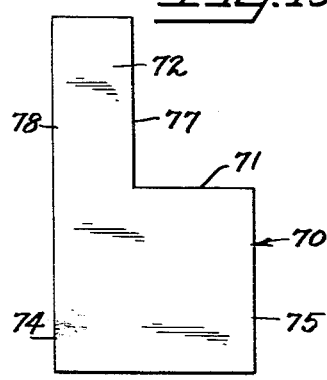

Fig. 19 is a plan view of a prefabricated cast adapted for application around the upper portion of the body and one arm.

Figure 20:
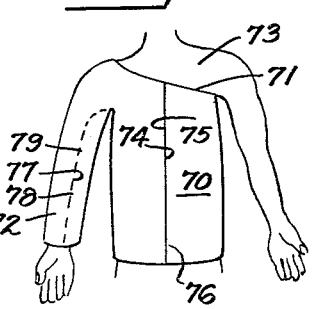

Fig. 20 is a diagrammatic view in elevation showing the cast of Fig. 19 applied to a portion of the body of a patient.

Fig. 21 is a top plan view, somewhat diagrammatic in nature and with each successive layer broken away, showing how one layer of net may be pre-stretched to limit the extendability in one direction.

Fig. 22 is a view similar to Fig. 21 showing another cast having two knit layers both pre-stretched in the same direction to limit the extensibility of the cast.

Fig. 23 is a top plan view of one layer of a cloth skeleton like that used for the cast shown in Figs. 16–18, showing inextensible cords used to limit stretch lengthwise.

Fig. 24 is a side view in perspective, partly broken away and partly in section showing a tubular cast with inextensible cords used to limit the stretch circumferentially.

Fig. 25 is a view in elevation and in section showing one construction of a tubular cast.

Fig. 26 is a view in elevation and in section showing a cast having beveled edges and over-all padding, waterproofed on one side.

The prefabricated cast or mold of my invention may comprise dry, unset plaster-of-Paris held by a stretchy base or skeleton of the desired size and shape. When water is added to the dry prefabricated article and worked into the plaster, the cast is ready to be put on the patient. At this time, the cast is stretchable and compressible so that it may be conformed to the body member; when the cast has set, it is rigid and strong.

The same principles may be applied to casts and molds made from other materials than plaster-of-Paris, such as plastics having suitable qualities. In that event, the liquid will be whatever is the proper solvent for the plastic, rather than water.

THE STRETCHABLE SKELETON OR BASE (FIGS. 2–7)

An important feature of the invention, no matter what the cast material, is the employment of a skeleton, frame, or base, that is extensible and contractable along both major dimensions. When stretched in one direction, the base gains in length at the expense of a loss in width; when stretched in a direction perpendicular to the first direction, it gains in width and loses in length. By alternately stretching and contracting the cast in these two directions, the cast can be accurately conformed to an individual body member.

It should be understood, however, that the stretch referred to above is not mere extension, for there is the corresponding contraction in the direction perpendicular to the direction of pull. Material that gets soggy or mushy when wet for application and that tends to act in such a way that, once stretched, its former dimensions cannot be regained—such material is not suitable for use in this invention. For example, felt and cotton batting tend to pull apart and to remain so; they do not respond sufficiently to crosswise pull, and they do not regain their original shape. Therefore, they are unsatisfactory. The additional fact that they do not expand enough when pulled is bad enough, but their inability to be conformed by being reduced in size after being pulled out, is their more important failure.

It is true that any material may be stretched somewhat, but in order to practice the present invention a really substantial change in dimensions is needed—a marked ability to expand and contract under pull. As a minimum amount, the material should be expandible about 25% in each dimension, as compared with a midway position. For example, a piece of material that was 4" x 4" square would have to be expandible to about 5" x 3" in pull in one direction, and to about 3" x 5" when pulled transversely. Actually, the base may expand and contract much greater than this, but it should not generally be less. If its "normal" position, as manufactured, means a greater stretch in one direction than in another direction, the maximum stretch in one direction may be less than 25%, if there is enough stretch in the other direction to make up a substantial equivalent of total stretch. Thus cotton print cloth is generally unsuitable because it is not stretchable to this degree, even when cut on a bias with respect to the shape of the base. On the other hand, crinoline and gauze may, for some uses, be satisfactory if (and only if) they are cut on a bias. Gauze or crinoline bandage material, as normally cut, is not expandable to any degree along the major dimensions; and so it could not be used as normally cut. Where the meshes of a net or of woven goods are larger than the threads, they are usually distortable about 33⅓% in each direction, when on a bias.

Cloth materials are generally preferred because the base or skeleton should be perforate, in order that the cast-forming material may adhere firmly and well. Metal materials are generally too rigid. As intimated above, the cloth fabric should be of the thread type and should be loosely constituted. Loosely knit material, such as loose tubular jersey, stockinet, and similar materials, may be used, so long as the threading may slip loosely over itself. The spacing of the threading so that the meshes are relatively wide, helps make knit material stretchable in the way required by this invention. Loose netting, such as fish-net, may be used, if placed on the bias, and it is a strong reinforcing material. Sometimes it is too stretchy, however, for convenient working, and then it has to be restrained in one of the ways that will be described later. Loosely woven material may also be used if placed on the bias. Material made from elastic threads, having the desired properties of stretch and recovery, may also be used, as described later.

For purposes of clarity, some of the terms used in the claims will be defined: A skeleton which is suitable, as explained above, will be denominated in such language as "a loosely-constituted thread-type cloth." As stated elsewhere the cloth is "arranged for a substantial amount of extension along either of its major mutually perpendicular dimensions." Preferably it should contract simultaneously along the other major dimension.

Figure 2:
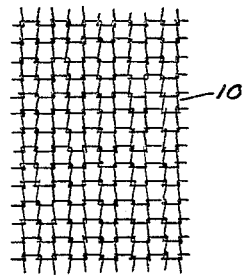
Fig. 2 is a plan view of a loosely knit type of fabric suitable for use as a base or skeleton for the prefabricated cast.
Figure 3:
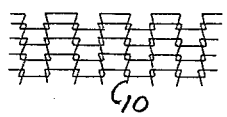
Fig. 3 is a plan view of the fabric of Fig. 2, stretched widthwise, showing how it extends widthwise and simultaneously contracts in length.
Figure 4:
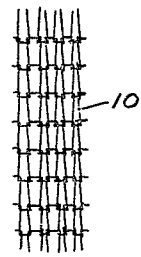
Fig. 4 is a plan view of the fabric of Fig. 2 stretched lengthwise, showing how it then contracts in width.
Figure 5:
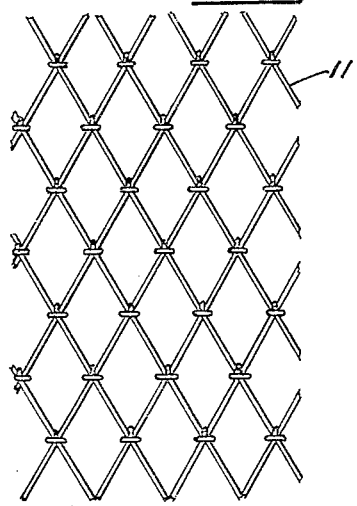
Fig. 5 is a plan view of a base or skeleton made from a net placed along a bias.
Figure 6:
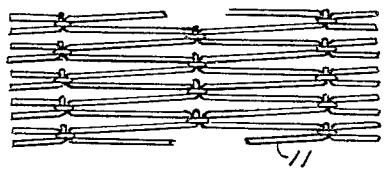
Fig. 6 is a plan view of the net of Fig. 5 stretched on the bias in one direction and thereby contracted in the other direction.
Figure 7:
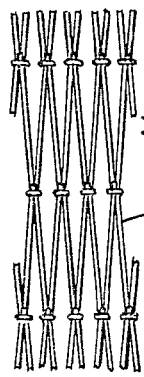
Fig. 7 is a plan view of the net of Figs. 5 and 6 stretched on the bias in the other direction from Fig. 6.

Two suitable fabrics are illustrated diagrammatically in Figs. 2–7. Figs. 2–4 show a knit fabric 10. When stretched in width (see Fig. 3), it contracts in length and vice versa (see Fig. 4). Figs. 5–7 show a net 11 arranged on a bias. When stretched, it is extended in one direction, and at the same time, it is contracted in the other direction. (See Figs. 6 and 7.)

As an example, one knit skeleton which I found satisfactory was a tubular knit piece with about 12 threads to the inch when it was in its normal condition, i.e., not stretched in either direction, when the meshes were almost square, as shown in Fig. 2. When this tube was stretched to its maximum length it was 36 inches long and 4½ inches in circumference. When it was stretched to its maximum circumference it was 10 inches long and twenty inches in circumference.

Another knit tube was of stockinet, ten threads to the inch in each direction. When stretched out lengthwise, it had 7 threads to the inch along its length and 34 threads to the inch along its width. When stretched widthwise, it had 34 threads to the inch along its length and 7 threads to the inch along its width. The circumference of the tube will then be varied by stretch from 12 inches to 58 inches.

Another circular knit fabric tested and used satisfactorily could be varied by stretch from 14 inches, as manufactured, to 17 inches in one direction, and from 12 inches, as manufactured, to 40 inches in the other direction. This particular material weighed about 26 grams per square yard.

Either grey goods or boiled and bleached cloth can be used, but the latter is preferable in most instances. In some cases, where the threads tend to become soggy or are otherwise affected adversely by wetting, the threads may be waterproofed, as by dipping the threads in paraffin before or after the cloth is woven, knit, or netted.

In the past, plaster-of-Paris casts have been made from crinoline or gauze strips or bandages stiffened with a sizing material such as starch before application of the plaster-of-Paris. Any carbohydrate sizing material, including starch, has furnished a culture medium for the growth of bacteria yeasts and moulds which may do harm to the patient's skin. Also, starch and other sizing materials have had adverse effects when the finished cast was drying, usually prolonging the setting time greatly.

I have found that these undesirable qualities and effects can be eliminated by sizing and waterproofing the fabric skeleton with paraffin. For example, the fabric base may be dipped in melted paraffin and then held in the shape which is desired while the paraffin cools. Or the cloth may be immersed in a solution of paraffin and then stretched out and held in the desired shape while the solvent evaporates. A very mild, not-unduly-rigid sizing with good waterproofing qualities can be obtained by dipping cloth in a 2% solution of paraffin in a paraffin solvent (e.g. benzine) at about 75° C. The higher the percentage of paraffin that is used, and the stiffer the paraffin, the more rigid the sizing will be.

This type of sizing is not affected by water, as are most sizings, and the cloth will keep its shape after water is added to the plaster-of-Paris. After placing such sizing on knitted goods, it is a good idea to stretch it out after it dries, using additional force if necessary, so that it will not be too stiff and will recover its usual qualities of extendability. It will do this because the paraffin makes the threads slide easier, even though it does stiffen them somewhat. This sizing does not appear to have much effect upon the extendable-ness or stretchy-ness of coarsely woven cloth on the bias or no net on the bias.

The heavier the threads of the fabric, the more important waterproofing tends to become, to properly control the setting and drying times of the plaster.

The necessary distortability may also be achieved by using loosely-constituted cloth made from threads that are themselves elastic and extendable, preferably using threads having a high amount of elongation ability. In this instance there is no contraction widthwise corresponding to lengthwise stretch, and the cloth can be stretched in both directions at once, the cast then becoming slightly thinner to compensate. To obtain good conformation, the cast is usually made a little smaller than the part to which it is to be conformed, is stretched out much larger, and then pulls itself back in. For some uses this is desirable, for others the other types of skeletons are preferable. Where the goods are made from elastic threads, they may also be knit loosely or woven loosely and placed on a bias, so that both straight elasticity and the distortionability earlier spoken of are present.

Casts made of elastic-threaded fabric have one unusual advantage: where a crack or break occurs in the plaster-of-Paris or other cast-stiffening material, the elastic threads remain intact across the break or crack. Consequently, the cast may be bent or distorted, because of the threads and cracks, but can still be put back together in their original shape, because of the interlocking edges at the cracks or breaks and because of the tendency of the unfractured elastic threads to draw the interlocking edges back to their original position. Therefore, tubular casts made from elastic threads can be opened by a sort of hinged window: a flap can be cut along one side and pulled the rest of the way open with breaks and cracks occurring and the flap can be put back in its original position after inspection.

One further advantage of casts and molds made from elastic threads is that they tend to conform more tightly at the time of application, without having to be worked. For molding purposes they conform very well to the surface of the body and record the outline of muscles and the like.

When multi-layered prefabricated casts have heavy fabric, of the required extendable or stretchable type, with large threads or cords of such materials as sisal, hemp, cotton, plastics or Fiberglas, this heavy fabric should be placed in the intermediary layers of the cast so as not to be near the skin side of the cast or about the outer surface of the cast. This prevents both irritation of the patient's skin by these rough or irritating substances and roughness about the outer part of the casts. These irritating materials may be used in the cast with more safety when the prefabricated cast has a layer of padding material in the fabric that is to lie next to the skin, as described in a subsequent section.

I have found that all these stretchable fabrics, whether or not they are made from elastic threads, maintain their ability to stretch, contract, and conform to the shape of a body portion when they are filled with or embedded in wet unset plaster-of-Paris or other mold-forming materials—until the cast or mold sets.

A suitable base makes it possible to fit any body portion with one of a few standard types of prefabricated casts; e.g., there may be small, medium, and large sizes for the different limbs and body members of children, and small, medium, and large sizes for adults. Because of its extensibility, contractability, and elasticity, a standard size mass-produced cast may be fit, smoothly and without wrinkles, to irregularities and individual pecularities of shape, even filling in cavities. This extensibility, contractability, and elasticity also make it possible to apply the cast without exerting undue pressure on enlarged or prominent areas of the body.

I have discovered that extensibility, contractability, and elasticity, which would be undesirable in a finished cast, end when the cast sets, and the plaster becomes rigid. Weight for weight, my improved prefabricated cast has as much tensile strength as prior art casts painstakingly built up by skilled operators from rolls and strips. In fact, my new casts suffer fewer breaks or cracks because they have fewer weak places, due to their greater uniformity.

BUILDING UP A PREFABRICATED CAST (FIG. 1)

Figure 1:
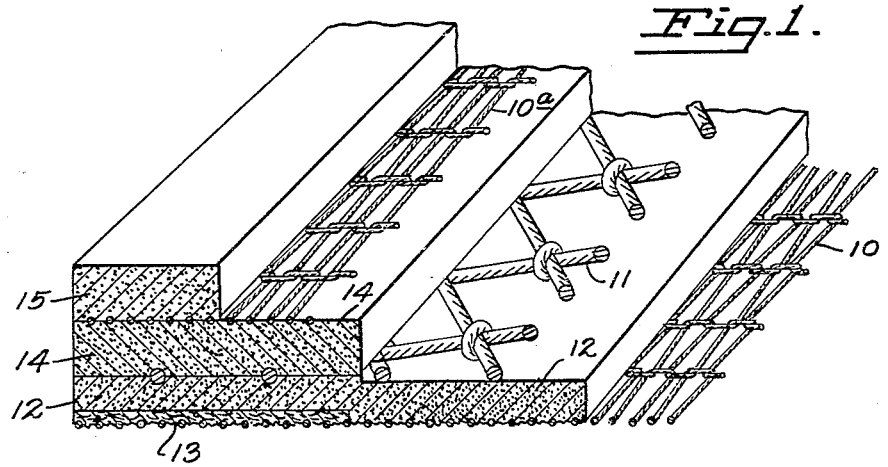
Fig. 1 is an enlarged diagrammatic view in perspective and in section, with parts broken away to show the layers of material in a prefabricated cast or mold embodying the present invention, and illustrating how these layers may be built up.

An example of how a prefabricated cast may be built up from stretchy fabric skeletons and cast-forming material is illustrated diagrammatically in Fig. 1.

The skeleton or base 10 of knit fabric may be filled with a layer 12 of cast- or mold-making material, such as plaster-of-Paris (which may be added either wet or dry as explained in the next section of this description). If the interior surface of the cast is to be padded, a layer 13 of padding (see the left-hand portion of Fig. 1) is preferably first placed directly in or over the base 10, and the layer 12 is added over the padding 13. The pading 13 may be made thick in some places (e.g. at the edges) and thin or absent at other places.

The layer 12 of cast-forming material may be built up to whatever thickness is desired. Then a net 11 may be placed over the layer 12 and filled with another layer 14 of cast- or mold-forming material. Over this may be placed a second knit skeleton 10a, on which may be added another layer 15 of cast-forming material. The cast may be built to any thickness desired by varying the number of layers and the thickness of each layer. The desired stretch, weight, and final rigidity may be obtained by making the proper choice of fabrics and mold-forming materials.

The prefabricated cast need not be elastic until liquid is added at the time when the cast is to be applied. Then the fabric layers and the whole cast can be stretched and contracted in either dimension. When the cast sets, it is inelastic.

Methods of causing the mold-forming material to adhere to the fabric will be discussed in more detail in the following sections. Depending on the method used, the article shown in Fig. 1 may be ready for packaging or application as soon as it has been built up, or it may have to have further processing (e.g. drying and reconverting some set plaster).

APPLYING PLASTER TO THE FABRIC IN PREFABRICATION

As an example, methods of combining plaster-of-Paris with the base will first be described, although some of the steps also apply to other cast-forming substances.

(1) *Sifting plaster in.*—The prefabricated cast of Fig. 1 may be made by mechanically sifting or working powdered plaster-of-Paris into the fabric skeleton or base. Where the base comprises a number of fabric layers, some plaster may be sifted into the bottom fabric layer, that layer covered with more dry powdered plaster, the next layer of fabric placed thereon, more powdered plaster added, and so on, until the cast is the desired thickness and contains the desired number of fabric layers. A prefabricated cast made by this method is preferably held in a tight package during shipment so that the plaster will not fall out. The package may be made by folding or rolling this prefabricated cast and encasing it in a container. Some type of separating material (as in Fig. 15) may be placed between the layers to prevent the plaster from being shaken out during shipment, to prevent some of the plaster from being washed out when water is added, and to facilitate the soaking in of water. This form of the invention, though satisfactory for many uses, is usually less convenient than where the plaster-of-Paris is bound into the fabric.

(2) *Binding plaster in.*—Any of the well-known processes for binding plaster-of-Paris to fabrics may be used to bind the plaster to the skeleton or base. However, processes using foreign binding materials, such as glues, are often objectionable because such foreign materials may be directly irritating to patients suffering from allergies or they may serve as a culture medium for yeast, bacteria, and harmful moulds.

To solve this problem, I here present a new method of binding plaster-of-Paris to fabrics without using foreign binding materials. I bind the plaster to the fabrics by the incomplete crystallization or setting of the plaster itself, most or all of this partially set portion being subsequently reconverted back to unset plaster-of-Paris. In practicing this method, I prefer to control the partial setting of the plaster, by wetting it with a solution of a retarder and water made up in proper proportions. The wet plaster may then be applied to the fabric base and dried at a controlled temperature.

The amount and type of the retarder depends on several factors. Some suitable retarders are methyl alcohol, ethyl alcohol, isopropyl alcohol, acetone, acetic acid, ethylene glycol, monoethyl ether and ammonium acetate. A solution containing a higher concentration of retarder gives a longer period between mixing and drying or partial setting, and this will be advisable with relatively thick casts. Where the drying temperature is to be relatively high, less retarder may be used. Some specific examples follow.

*Example 1.*—A method of binding plaster to fabric using isopropyl alcohol as a retarder A mixture of 60% isopropyl alcohol and 40% water may be mixed with the dry, unset plaster-of-Paris. The wet mixture 12 is then spread on the fabric member 10 or 11 and allowed to set partially. If desired, several layers may be built up. About fifteen minutes after the time of mixing, the plaster-coated fabric may be dried for about two hours in an oven at a temperature of about 115° C. After the water and alcohol have evaporated, the temperature may be raised to about 140° C. and held there for about 3 hours to reconvert the portion of the plaster that was set. (Plaster-of-Paris is $CaSO_4 \cdot \frac{1}{2}H_2O$; gypsum or set plaster is $CaSO_4 \cdot 2H_2O$; some but not all of the water of crystallization must be driven off from set plaster to reconvert it. If the $CaSO_4$ is completely dehydrated, it will not take up water and it is useless as a cast material.) When the plaster has been reconverted, the article is ready for packaging or for immediate wetting and application. This process may be used for casts ¾" thick or thicker.

*Example 2.*—A method of binding plaster to fabric using acetic acid as a retarder A solution of 40% acetic acid in 60% water will cause sufficient setting of the plaster to the fabrics, if the casts are not over ¾" thick. About thirty minutes after mixing, the coated fabric may be placed in an oven at about 115° C. The plaster will dry in the oven in about two and a half hours. Then the temperature may be raised to about 140° C. for three hours to reconvert the partially set portion back to plaster-of-Paris. Other retarders and different percentages may be used.

*Example 3.*—A method of binding in gypsum with the plaster

A mixture of gypsum with unset plaster-of-Paris may be used. The proportions may vary from about 0.5% to about 80% of the unset plaster-of-Paris, and from about 99.5% to 20% gypsum.

The mixture may be moistened in a solution containing sufficient retarder to give a convenient working time. For example, no retarder is necessary with a mixture of 98% gypsum and 2% plaster-of-Paris. With a mixture of 20% gypsum and 80% plaster-of-Paris, a 20% isopropyl alcohol solution or a 10% acetic acid solution will give a working time of about thirty minutes between mixture and dehydration in a temperature of about 115° C. to about 140° C.

The wet mixture is spread on the stretchable fabric base and permitted to set. It may then be subjected to a temperature of about 140° C. for about four hours to convert the gypsum to plaster-of-Paris.

The hardness or rigidity of the binding may be somewhat controlled by the amount of plaster-of-Paris that is permitted to set. The greater the amount of the plaster that is permitted to set before the setting process is stopped, the harder the binding will be. A relatively hard and rigid binding will take longer to soften when water is added, in comparison with bindings having less set plaster. In the mixture of 98% gypsum with 2% plaster-of-Paris, where no retarder is added, a stronger and harder binding of the plaster mass to the fabric may be obtained by drying it in the air before dehydrating it at a temperature of about 140° C.

The above successful methods of binding plaster-of-Paris to fabrics without foreign materials are based on my discovery that a small percentage of set plaster-of-Paris will act as a binder for the remainder so long as the prefabricated cast is dry. This holds true even when it has been heated sufficiently to reconvert it to plaster-of-Paris and even though it will lose its binding effect and react normally when water is added. At that time, however, the very fact that the plaster is wet and pasty will keep it in the cloth.

The plaster-of-Paris may be put in the fabric in suspension form, so long as proper retarders are used and proper conditions are present. With a thick suspension, considerable mechanical effort may be required to distribute the plaster through the fabric's meshes. A semi-liquid suspension enters the meshes more rapidly and still adheres to the threads. The fabric may be passed once or twice through the suspension, or the suspension may be passed through the fabric. I have found that a very satisfactory suspension consists of 1200 cc. of retardent-water solution and 2,000 grams of plaster-of-Paris. Gum or starch tends to make such a mixture too thick, and if it is desired to use them, the amount of plaster should be reduced or the amount of solution increased.

CAST-STIFFENING AIDS FOR PREFABRICATED CASTS

A great deal of effort has been made to lighten the weight and increase the strength of the plaster in plaster-of-Paris casts. The reinforcing fabric in my prefabricated cast greatly strengths the cast as a whole, but does not affect the plaster itself, which tends to be brittle.

Recently some manufacturers have combined resins with plaster-of-Paris so as to strengthen the cast and make it possible to have stronger and lighter casts with less plaster-of-Paris. For example, melamine resins have been used with excellent results, one such resin being an orthopedic melamine formaldehyde composition sold under the trademark Melmac by Davis and Geck and manufactured by American Cyanamid Company.

These resins have heretofore been added to the water used for wetting the plaster-of-Paris. For example, Melmac, product No. 211, orthopedic composition, has been used by adding 276 grams of the resin and about 12 grams of ammonium chloride as a catalyst to 473 cc. of warm water. After some effort the materials mix with the water to form a fluid more viscid than water. The plaster bandages or strips were then dipped in this material instead of in plain water.

Some prefabricated casts of my invention may be properly wet with this viscid material, but as a whole it is not satisfactory. Also it slows down operations and loses some of the advantages of prefabricated casts.

I have developed a satisfactory method of using such resins in prefabricated casts. My new method beings by mixing the dry plaster-of-Paris, the resin, and the ammonium chloride catalyst, grinding the mixture to a fine powder. Isopropyl alcohol is then added to this powdered mixture to make up a paste or semi-fluid suspension. The resultant semi-fluid mixture is applied to the fabric, as in the examples just described, and the isopropyl alcohol is permitted to evaporate, preferably in such a way that this cast mixture adheres to the fabric. Preferably, the drying operation is done in a very humid atmosphere so that evaporation is slow, for water acts on the resin to help bind the mixture to the cloth. When evaporation is to be accelerated by heat, a small percentage of water may be added to the isopropyl alcohol to produce binding. In a fast operation with heat evaporation, 10 percent of water may be used. As a rule the hardness of the binding is increased by increasing the percentage of water and by increasing the time between mixing and evaporation. With 10 percent water in the isopropyl alcohol, the mixing and evaporating time is about fifteen minutes. Where a longer operating time for mixing and applying and evaporating is required, a smaller percentage of water may be used. Many operations will not be completed fast enough to use 10 percent water, and where an hour or more is needed for the operation, 3 to 5 percent water will be preferred. Too much water, especially if the catalyst be present, tends to make a binder so hard that it will not break down when the water is added to make the plaster ready for application. Omission of the catalyst makes a softer binding.

Where the plaster-of-Paris, resin, and catalyst have been applied to the prefabricated cast, all that is needed to prepare the cast for application is to add the proper amount of water. In case the ammonium chloride catalyst was not added previously, it can be put in with the water because it does not change the viscosity of the water.

To produce this cast material successfully in one instance, a mixture, in the proportions of plaster-of-Paris 66 grams, Melmac 32 grams, ammonium chloride catalyst 1.3 grams, was thoroughly powdered and mixed together. To this was added 80 cc. of isopropyl alcohol. Where a slow evaporation process was used, and where the isopropyl alcohol was anhydrous, a very high humidity in the air where the evaporation went on was found to give some binding. Where a fast evaporation process was used, a small percentage of water was mixed with the alcohol before adding the liquid to the powder mixture, to give a binding. The semi-fluid mixture is preferably well agitated and applied to the fabric by dipping, spraying or other mechanical means. In this instance, after this semi-fluid mass was applied to the fabric, the evaporation process was started and continued until all the isopropyl alcohol and added water, where there was some, was evaporated. Where no water was added to the isopropyl alcohol, evaporation was done without heat and in very humid air, when binding was desired, the temperature of the air being up to as high as 40° C. When the evaporation process was to be hastened by heat, a small percentage of water was added to the alcohol to aid in binding. Temperatures above 75° C. are inadvisable with this resin.

In some prefabricated casts where this resin material was used, it worked better when the fabric was processed and bound in with the cast material one or two thicknesses at a time, these thicknesses then being combined to build up the desired thickness.

When dealing with resins which might possibly cause allergic reactions, the casts may be made with those layers next to the skin made from pure plaster-of-Paris not containing the resin, the middle and outer layers of the cast containing the resin. Also prefabricated casts can be made to protect the skin of the patient from these materials by having a layer of waterproof padding material between the cast material and the skin.

OTHER MATERIALS FOR STIFFENING THE CASTS OR MOLDS

In addition to plaster-of-Paris, other stiffening materials, inorganic or organic, may be used with the stretchable fabric skeleton in carrying out this invention.

Among the inorganic materials are clays, cements, and mixtures of these with each other or with plaster-of-Paris.

Among the organic materials suitable for use in casts or molds are various plastics; e.g., Celluloid, polymerized vinyl compounds (esters, acetals, and ester acetals of polyvinyl alcohol), cellulose acetate, cellulose nitrate, and mixtures of cellulose esters and cellulose ethers. Any other plastic may be used that has low toxicity on contact with human beings and that can be made viscid by adding a solvent of low toxicity.

These plastics may be bound to the threads or to the fibers of the threads before weaving, in the case of coarse nets or coarse woven fabric, and the fabric will still have a fair extendability and contractibility along the bias when the fluid is added to make the cast ready for application. Likewise, the plastics may be bound on these nets and woven fabrics by dipping and the like after the fabric is woven or netted, and the fabrics still retain a usable amount of extendability and contractibility. On the other hand knit fabrics, which extend and contract by virtue of the thread loops gliding on each other, lose in their ability to extend and contract by having the plastic stiffening material bound to the threads of the fabric. This is due both to the stiffening of the threads at the loops and to the increased friction at the loops where the threads have to glide over each other. Knit material will still keep its extendable and contractable qualities at the time the article is treated with the proper liquid for application, if the plastic stiffening material is put in the layers 12 and 14 in Fig. 1, in the form of finely divided particles, because this eliminates the stiffness and the friction of the gliding loops.

The plastics may be used alone, or they may be filled with relatively-finely divided particles of such materials as magnesium, wood pulp, or other plastics, so long as the prefabricated cast becomes pliable, moldable, and stretchable when the solvent is applied. The fabric itself must not become too soggy in the solvent; it should still elongate in one direction when pulled and preferably should also contract in the opposite direction.

Prefabricated casts using plastics may be canned in the suitable solvent so that the casts are pliable and ready for use; or the plastics may be packaged thoroughly dry, ready for the application of a suitable solvent (e.g., acetone, ethyl acetate, or whatever is the proper solvent for the particular plastic being used). Where the cast is to be moistened inside a container, the container must, of course, be insoluble in the solvent that is to be used.

CONTROL OF STRETCH

Some materials from which the cloth skeleton 10 may be made are too stretchy, they tend to elongate too far when pulled. This may be the case with very loose weaves, very wide-mesh netting, very loose knit material, and material having very extensible elastic threads. These materials may have other desirable characteristics: their threads may be strong, they may be inexpensive, and so on.

I have found that it is possible to use these excessively extensible materials in multi-layer skeletons by pre-stretching some layers in one direction and some in another direction. By pre-stretching one layer lengthwise (for example) up to the point where only the desired amount of stretch remains in that layer, the extensibility of the cast itself is limited to that amount. Another layer may be pre-stretched widthwise up to the point where only the desired widthwise stretch remains, and then the cast is limited in stretch both widthwise and lengthwise. The layer that was pre-stretched lengthwise would, by itself, be excessively elongable widthwise, but it is restrained by the layer that was pre-stretched widthwise, and vice versa.

Instead of pre-stretching, control of stretch may be obtained by incorporating inextensible or less extensible members in one or more directions. These control means are sometimes more desirable and sometimes less desirable than the pre-stretching means described.

Examples of these different ways of controlling stretch appear in Figs. 21–24.

The cast 100 of Fig. 21 includes, reading from right to left and also from the bottom up, a first layer 101 of plaster-of-Paris or other cast-forming material; a first layer 102 of loosely knit cloth fabric in unstretched, neutral position; a second plaster layer 103; a second knit layer 104, also unstretched; a third plaster layer 105; a layer 106 of coarse netting, prestretched along the direction parallel to the top of the page, so that little stretch remains in that direction; a fourth plaster layer 107; a third knit layer 108; a fifth plaster layer 109; a fourth knit layer 110; and a sixth plaster layer 111. Although only the netting 106 is pre-stretched or pre-extended, it controls the entire cast 100, and the stretch of the cast 100 in one direction is limited to the amount of extension of which the net 106 is capable.

The cast 120 of Fig. 22 comprises: a bottom layer 121 of cast-forming material, such as plaster-of-Paris; a first layer 122 of undistorted, unstretched, loosely woven cloth in its neutral position; a second layer 123 of plaster; a first layer 124 of pre-stretched knit fabric; a third plaster layer 125; a layer 126 of undistorted, unstretched netting; a fourth plaster layer 127; a second pre-stretched knit fabric layer 128; a fifth plaster layer 129; a second undistorted loosely woven cloth 130; and a sixth plaster layer 131. Here, as in Fig. 21, there are five layers of cloth, but there could be more or fewer layers. Here, also, as always, the netting 127 and the loosely-woven layers 122 and 130 are placed on the bias. Although the netting 127 is capable of great extension in either direction, the extensibility of the cast 120 has been limited by the prestretch of the knit layers 124 and 128. Here both layers 124 and 128 were pre-stretched in the same direction, but if a limitation of stretch in both directions is desired, one could be stretched one way and the other one normal thereto.

Fig. 23 shows only one layer 140 of the cloth skeleton of a cast, resting on the plaster layer 141. The cast is slit part way up the middle at 142. Two inextensible cords 143, 144 extend lengthwise and are knotted at intervals to the skeleton 140 by knots 145. Extension can therefore take place only in the direction perpendicular to the cords 143, 144. The knotting is not essential, but helps.

Fig. 24 shows a tubular cast 150 in the center of which are incorporated a few inextensible cord loops 151, 152, 153, to limit the circumferential extension of the cast 150. Some stretch can be provided by wrinkling or sinuating the cords.

PADDING

As shown in Fig. 1, the prefabricated casts may have a soft layer 13 of padding between the inner fabric member 10 that lies against the skin and the plaster 12. The padding 13 may line the whole cast or it may be placed only at the edges or in portions of the casts where there are bony prominences requiring additional softness.

The padding 13 is preferably some soft compressible material of a type that is moldable or stretchable when the casts are wet and being put on, so that it may then be conformed to shape without becoming damaged. It may, for example, be paper pulp or it may be shredded cellulose fibers, shredded rags, shredded wool, shredded glass fiber, layers of creped absorbent paper, cotton particles, sponge rubber, foam rubber, shredded felt particles, or sheets of absorbent cotton such as cellucotton. Shredded particles may be between 1 mm. and 1 cm. in diameter, and in some cases larger; some materials may be used in continuous sheet or strip form.

Continuous sheets or strips of the padding may be lightly glued to the fabric 10. Masses of small particles may be floated in, blown in, sucked in, or placed on the fabric by some mechanical means, and they may be lightly glued to the fabric 10, or they may be held by their own properties of adhesion and cohesion. In some cases, the padding will be stretchable only when wet, and in other instances it will stretch wet or dry.

If desired, the particles or other padding may be waterproofed with oil, paraffin, or some other material. For example, particles of ordinary sheet wadding about one cubic millimeter in size, may be waterproofed and then combined with 10% paper pulp and placed between layers of the proper fabric. This padding is stretchable and moldable when wet and dries easier and gives a better padding than do unwaterproofed particles.

When the prefabricated cast is being built, either wet or dry, the layer 13 or a plurality of layers of padding material may, if desired, be incorporated between adjacent fabric layers 10 and 11 in place of the plaster-of-Paris to any extent desired. The padding 13 may be added at the time the cast is built up (as in Fig. 1) or it may be added later. For example, when small particles, such as paper pulp, shredded rags, shredded cellucotton, shredded sponge or shredded foam rubber are used as a padding, they may be added to the cast by turning a wet tubular prefabricated plaster-of-Paris cast wrong-side-out, placing the particles of padding material on the then outer layer, covering them with a tubular layer of net or other fabric, and turning the cast back around so that the padded part becomes the inside.

Where no padding material is used, the innermost fabric layer will contain plaster. Even where padding is used, an innermost fabric layer is preferably placed between the skin and the padding, because the padding tends to become ruffled and to form rough lumps when it is on the skin side. In some instances, the padding material may occupy several thicknesses between layers of fabric, or even replace the plaster-of-Paris entirely. The entire outside edges, for example, may comprise only padding, thereby protecting the skin from hard sharp edges.

The padding material may be placed on both sides of the prefabricated cast and also at the edges. In place of the cast-forming material being placed in the surface layers and edges of the fabric skeleton, the padding material replaces it there.

In some cases the padding material on one side of the cast may be waterproofed by dipping the padding in a 1 percent paraffine and 99 percent benzine solution, pressing out the excess liquid, and permitting the benzine to evaporate, leaving the paraffine. In such a case, the case is wet only by water entering through the non-waterproofed side of the cast. The cast should be packaged with the corrugated side of a one-sided corrugated cardboard placed next to the non-waterproofed side and with the smooth side of the cardboard next to the waterproofed side of the article. In case the package is rolled, the corrugations of the cardboard should go in the longitudinal direction of the roll.

Fig. 26 shows the composition of a cast 160 having over-all padding. The inmost cloth layer 161 may be shorter, as shown, than the next layers 162, 163, and then may be shorter than the outside layers 164, 165, so that the outer edges of the cast are beveled, as shown. A layer of padding 166 is held by the entire cloth layer 164, and another layer 167 of waterproofed padding lies next to and is held by the cloth layer 165. Plaster 168 fills the remainder of the space.

Over-all padding not only cushions the edges. It also prevents injury to other limbs that may strike the hard cast. The waterproofed padding 167 means that the cast 160 can be waterproofed, but it also means that the operator will get no plaster on his hands while applying the cast 150 thereby saving time because he does not have to rinse his hands.

The incorporation of padding in the cast—between the fabric skeleton and the plaster—is a feature that I believe to be novel. Padding has previously been built up around an arm before the cast is put on, but, so far as I am aware, it has not been incorporated in the cast material at the time of manufacture or at another time before they are wet and pliable as at the time of application.

SHAPES, DESIGNS, AND FORMS, IN GENERAL
(FIGS. 8–20)

When fabric of the proper selection, size, and pattern has been coated with padding or with the wet plaster suspension or with both, it may be stretched over a form and shaped before it is dried and packaged. Non-plaster casts may be similarly shaped.

The casts of this invention may be made in a variety of shapes to take care of any limb or body member of any size of human body. For example, it may be tubular so as to fit an arm or leg. (See Figs. 11 and 12); it may be a flat strip (Fig. 15) which is cut to shape just before application; it may be cut to fit over the lower torso and also cover each leg (Figs. 16–18); or it may be cut to fit around the chest and one arm (Figs. 19 and 20); or it may be any other shape. A body portion may be encircled by a single flat piece curved around a limb (Figs. 16–20), by two flat pieces put together, or by a member prefabricated originally as a tube.

No matter what its shape, design, or form, the elasticity of the prefabricated cast enables it to assume a variety of final shapes and sizes. If the part or extremity is medium in size and only a large prefabricated cast is available, this large cast may be reduced in size along one direction by stretching it in the other direction; the surplus length may then be cut off or the end may be folded back. On the other hand, a medium-size cast may be stretched to fit over a large diameter body extremity, and would be somewhat thinner and shorter therefrom. Moreover, a cast may be made in which a portion is tubular and another portion flat.

Specific shapes of prefabricated casts are discussed below in Examples 4–8.

PACKAGING (FIGS. 8–10 AND 13–15)

A tubular cast may be packaged flat, with or without a flat separator member in the center (Fig. 8) or it may be packaged in the round, with or without a center form (Fig. 13), or it may be put around a form that simulates a part of the body. Similarly, the non-tubular prefabricated cast may be packaged flat, individually or in stacks, with separating members in between adjacent casts. Either tubular or non-tubular casts may be packaged by rolling them up, a separating member preferably being located between the adjacent convolutions (Fig. 15).

The form, separating member, or center board, may be made from cardboard, plastic, heavy paper, light paper, or other materials. It may be flat, round, or any other suitable shape. In rolled casts like Fig. 15 it is relatively flexible whether wet or dry. In flat casts like Fig. 8 it is preferably a member 24 that is rigid when dry but flexible when wet. There may or may not be perforations and corrugations to aid in soaking the cast with water.

The casts may be packaged inside a flexible, waterproof container, such as the container 25 as shown in Figs. 8, 9, and 10 or the container 31 shown in Figs. 13 and 14. When mold-forming plastics are used instead of plaster-of-Paris, the container will be insoluble in the solvent that is used with the plastic. The container may be sufficiently tight so that it will hold only the cast and the correct amount of water, to prevent the addition of excess water, or a measured amount of water may be added to each package, the correct amount being stated on a label or accompanying instructions. Preferably, the inner container is transparent so that the operator can watch as the water is worked into the plaster.

There may also be an outer, more rigid cover such as the member 26 in Figs. 8–10 and the member 32 in Figs. 13 and 14, to protect the cast during shipping and to withstand the pressure when the water is added. After most of the water is soaked into the cast, the outer cover may be removed, and the plaster worked inside the thin transparent inner container until it is ready for application.

SPECIFIC EXAMPLES OF PREFABRICATED CASTS

*Example 4.—A prefabricated, tubular cast in a container, stored flat around a wetting board (Figs. 8–12)*

The packaged prefabricated tubular cast 20, shown in Figs. 8–12, is suitable for application around an arm or leg. The plaster 21 is held by a fabric skeleton 22 that includes one or more tubular fabric members, the cast being built up generally in the manner described in connection with Fig. 1. Preferably, there will be bases of both fairly-closely knit fabric (like the fabric member 10 in Fig. 1) and a more coarse type of net (like the fabric member 11 in Fig. 1) to give the cast greater strength, with the coarser fabric inside rather than on the surface the skin may touch. The plaster-of-Paris 22 may be bound to these fabric members, or it may be loose.

The prefabricated cast may, if desired, have padding material like the pad 13 in Fig. 1, between the inner lining and the plaster. For example, paper pulp, shredded cellulose fibers, shredded rags, or fiber glass may be floated into the interior fabric member. The padding may be of uniform thickness, or it may be thick in some places and thin in others, or present in some places and absent in others.

Through the center of the tube 20 there may be a flat board or separating member 24 made from cardboard, plaster, paper, or another material of a type which is rather rigid when dry, and loses its rigidity when wet. Corrugated cardboard is suitable.

The prefabricated cast 20 may be built up around the center stiffening member 24 and, when dried, placed inside an inner container 25, which is preferably flexible, waterproof, transparent, relatively soft, and strong enough to stand working of the plaster. Around the inner container 25 there is preferably a rigid outer container 26 that protects the cast 20 during transportation and storage and prevents it from collapsing from the water pressure when water is added.

When the prefabricated cast 20 is to be used, the flap 28 at one end of the outer container 26 is opened and an end portion of the inner container 25 is opened to form a funnel portion 27 through which water may be introduced inside the inner container 25. (Fig. 9.) The outer container 26 and the inner container 25 may be made so that they hold only the cast 20 plus the exact amount of water which the plaster should soak up; or they may be made larger and a label affixed to the package 26 indicating the proper amount of water to be added. When water has been placed inside it, by pouring it down the funnel portion 27, the inner container 25 may be held closed, by folding the funnel-portion flap 27 over as in Fig. 10, while the entire package is turned up and down a few times to facilitate soaking-in.

The inner container 25 may then be removed from the outer container 26 and the plaster may be kneaded, rolled, twisted, etc. in it to distribute the water thoroughly and prepare the cast for application (Fig. 10). If the inner container 25 is transparent, the operator can see when the plaster is ready for application. Kneading, rolling, or twisting the prefabricated cast in the inner transparent jacket aids in distributing the water and softening the plaster. The ease of rolling or twisting and the softness to touch in kneading indicate the extent of distribution of the water. Similar procedure is also applicable to casts and molds made from various plastics, the correct solvent being used in place of water. When the cast 20 is ready, it is removed from the inner container 25, and the center stiffening member 24 may then be taken out and discarded, leaving a passage all the way through the flattened tubular cast.

The cast 20 is next worked into an enlarged rounded tubular shape that can readily be put over or around the part to be cast. Where necessary, the tubular cast 20 is stretched out in width to get it around the foot (see Fig. 11) or the elbow or knee or whatever is the widest part of the particular limb. After being placed around the part, the cast 20 may be pulled lengthwise to reduce its diameter and fit the part. (See Fig. 12.) This may be done relatively easily with a relatively small amount of working, compared to what had to be done with casts built up from strip materials.

*Example 5.—Prefabricated tubular cast rolled like a stocking (Figs. 13 and 14)*

A modified cast 30 generally similar to the cast 20 is shown in Figs. 13 and 14. The cast 30 also may have one or more layers of tubular fabric of the proper type to which plaster-of-Paris is bound or loosely held. Again there may be padding material about the interior surface of the cast 30. The main difference is that as shipped, stored, and prepared for use, the cast 30 is rolled up somewhat the way stockings may be rolled. Its inner container 31 and its outer container 32 are therefore a different shape from the containers 25 and 26, but in general their purposes are the same. The outer cover 32 is sufficiently rigid to withstand shipping without folding and to prevent distortion from water pressure when water is added to the plaster. The inner container 31 is preferably waterproof, pliable, and transparent. There may be a core in the center of the prefabricated cast 30, or the inner container 31 may be brought up through the inside of the cast.

In manufacture, the cast 30 may be rolled as soon as the plaster has been applied. Normally, the fabric is stretched diametrically to make a relatively wide tube that will easily go around a limb and can be tightened around it later by being pulled out lengthwise. If the plaster has been applied to the fabric base wet, the cast 30 is dried rolled. When dry, it is ready for packaging.

After the addition of water to the inner container 31 and the initial soaking of the cast 30, the outer container 32 is removed, and the plaster is worked as in Example 4. When the plaster is ready, the cast 30 is removed from its inner container 31, placed over the limb and rolled out around it, as in Fig. 14. For example, a leg cast is placed on the foot and then unrolled up the leg. The stretchability of the fabric with the wet plaster in it, enables it to be conformed to the shape of the leg, by stretching it first in one direction and then in the other. When completely unrolled and conformed, it is permitted to set in the normal manner.

*Example 6.—Prefabricated cast or mold on spiral roll (Fig. 15)*

The prefabricated cast 40 of this example, which may be either tubular or non-tubular may be built up as shown in Fig. 1. Then a separating paper or corrugated cardboard member 41 may be placed over or under it and the assembly rolled up spirally, somewhat like a jelly roll. If corrugations are used, they preferably run parallel to the axis of the roll 40. The paper or corrugated cardboard 41 prevents the cast 40 from sticking together when it gets wet. There need be no center core member, though there may be one if desired. For shipping and storage, the cast 40 may be inserted into a waterproof container similar, except in shape, to the containers 25 and 31 previously described, and this, in turn, may be protected by a relatively rigid outer container.

If the cast 40 were tubular, there would preferably be a second separating member like the member 41 inside the tube.

In use, the cast 40 may be moistened by pouring water into its inner container, as before. After being worked, the cast 40 may be taken out and unrolled about the body member. In some cases, it may be applied spirally round and round a limb, similar to the way in which prior-art plaster casts were applied, but with this difference: the fabric being stretchable, it is possible to make the cast 40 conform smoothly to the body member. On the other hand, the prefabricated cast 40 may be of such size and shape that when it is unrolled it is ready to fit over or around the body member without winding.

*Example 7.—Prefabricated casualty cast for both legs and the lower portion of the body (Figs. 16–18)*

The prefabricated cast 50 is well adapted for taking care of battlefield and similar casualties. As is shown in Fig. 16, it is flat and is split axially at 51 for about half its length. It may be packaged flat or may be rolled similarly to Example 6 (Fig. 15).

When the cast 50 is to be applied, it may be moistened, worked, and then spread flat on a table or other horizontal surface. The patient 52 may be placed on top of it, as shown in Fig. 17, and then the edges of the cast may be brought around him and secured together as shown in Fig. 18. The upper portions of the edges 53 and 54 are brought around the patient's body 55, the cast 50 being stretched, if necessary, and joined along the line 56. The lower portion of the outer edge 53 and the edge 57 (which lies along the split 51) are brought together around the patient's left leg 58, and joined along the line 59. The lower portion of the outer edge 54 and the edge 60 (also formed by the split 51) are brought around the patient's right leg 61 and joined together along the line 62.

There is no comparison between the ease of applying the casualty cast 50 and the difficulties of painstakingly building up such a cast by the old method of winding plaster-coated strips of gauze.

*Example 8.—Prefabricated casualty cast for the upper portion of the body and one arm. (Figs. 19 and 20)*

The prefabricated cast 70 is another casualty cast. It may be pre-formed to the shape shown in Fig. 19, or wide non-tubular rolls of prefabricated material may be cut to size just before application. The cast 70 is roughly L-shaped, the wide portion 71 being adapted to fit around the upper portion of the body, with the narrower portion 72 fitting around one arm.

After the cast 70 is moistened, it is applied to the patient 73 either from the front or from the rear. The edges 74, 75 of the wide portion 71 are closed around the body and joined along the line 76. The edges 77, 78 of the narrow cast portion 72 are joined around the arm along the line 79. The cast 70 may be applied in a very few moments, whereas it would take considerable time to wind a strip-type plaster cast around this relatively large area, and the quality would then depend on the skill of the operator.

*Example 9.—Another prefabricated tubular cast (Fig. 25)*

By way of example only, the cast 170 is shown formed around an oval form 171. It could be made as easily around a rectangular form or around the cardboard form 24, used in Fig. 8.

The basic principle shown in the cast 170 is the use of inner and outer cloth tubes with the remainder of the skeleton being wound around the inner tube before being covered by the outer tube.

The inner tube 172 of loosely knit stockinet is slipped over the form 171 (or board 24). Then suitable fabric 173 (woven or net cloth on a bias or knit cloth) is wound around the tube 172. Preferably the fabric 173 has previously been coated with plaster 174, so that the operation is very simple and can be done rapidly by machines. After the desired thickness has been built up, the continuous cloth strip 173 is cut off, and is covered by an outer knit tube 175. The result is a rapidly made prefabricated tubular cast.

The present invention, by using a stretchy prefabricated cast, greatly reduces the time of application and makes it possible for a relatively unskilled person to put on an excellent cast, even where the cast would have been called an exceedingly difficult and complicated one, by prior-art standards. The patient is taken care of much more quickly and the cast is superior in overall strength, in comfort to the patient, and in uniformity.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A prefabricated article for forming casts and molds, said article comprising, in combination, a plurality of superimposed concentrically disposed seamless, tubular layers of loosely knit cotton cloth, each layer of cloth being formed of intercoupled threads in coacting relationship with each other, with certain threads intersecting other threads at juncture points forming oblique angles and defining open interstices therebetween, with the distance between adjacent juncture points along any thread being greater than the diameter of any of the threads, so that when pulled the layers of cloth will deform without stretching the intercoupled threads by having the juncture points which are generally aligned to the direction of pull separating a substantial amount in relation to each other and the juncture points which are generally aligned transversely to the direction of pull converging a substantial amount in relation to each other, said cloth being extendable at least 25% in each direction, said threads being coated with paraffin so as to respond when wet as when dry, and plaster of Paris carried by each layer, whereby when said article is moistened, said plaster of Paris first becomes workable and then sets to a rigid form, and, while workable, said article can be extended widthwise and placed as a tube around a solid body that extends through said tube and can then be extended lengthwise to fit snugly around said body, a smooth and even conformation being obtained by working the moistened article into shape by virtue of the deformable nature in every portion thereof and by virtue of its ability to hold a shape to which it is deformed without being under substantial tension.

2. A prefabricated article for forming casts and molds, said article comprising, in combination, a plurality of superimposed concentrically disposed tubular layers of loosely knit cloth, each layer of cloth having certain threads in coacting relationship with other threads which intersect said certain threads at juncture points defining open interstices therebetween with the distance between adjacent juncture points along any thread being greater than the diameter of any of the threads, the threads being slidable on each other at the juncture points so that when pulled the layers of cloth will deform without stretching the threads by having the juncture points which are generally aligned to the direction of pull separating a substantial amount in relation to each other and the juncture points which are generally aligned transversely to the direction of pull converging a substantial amount in relation to each other by virtue of their sliding, said cloth being extendable at least 25% in each direction from a neutral position, and plaster of Paris carried by said layers, whereby when said article is moistened, said plaster of Paris first becomes workable and then sets to a rigid form, and, while workable, said article can be extended widthwise and placed as a tube around a solid body that extends through said tube and can then be extended lengthwise to contract widthwise and fit snugly around said body, a smooth and even conformation being obtained by working the moistened article into shape by virtue of the deformable nature in every portion thereof and by virtue of the ability to hold a deformed shape without being under substantial tension.

3. A prefabricated article for forming casts and molds, said article comprising, in combination, at least one layer of loosely constituted cloth, each layer being formed of intercoupled threads in coacting relationship with each other with certain threads intersecting other threads at juncture points and defining open interstices therebetween with the distance between adjacent juncture points along any thread being greater than the diameter of any of the threads, so that when pulled the cloth will deform without substantially stretching the individual threads, by having the juncture points generally aligned to the direction of pull separating a substantial amount in relation to each other and juncture points generally aligned transversely to the direction of pull converging a substantial amount in relation to each other, said cloth being extendable at least 25% in each said direction from a neutral position; and settable material carried by each layer, whereby when said article is in a wet state, said settable material is workable and when dry sets to a rigid form, and, while workable, said article can be deformed in either said direction and conformed to a body by said deformation to fit snugly thereon, a smooth and even conformation being obtained by working the moistened article into shape by virtue of the deformable nature in every portion thereof and by virtue of the ability to hold such deformed shape without being under substantial tension.

4. A cast or mold forming article, comprising, in combination, a fabric having certain threads extending substantially parallel to one of the major dimensions of the fabric and in coacting relationship with other threads extending substantially transverse thereto which intersect said certain threads at juncture points defining open interstices therebetween with the distance between adjacent juncture points along any thread being greater than the diameter of any of the threads and with the juncture points which are disposed in rows generally aligned with said certain threads separating a substantial amount in relation to each other in response to a pull being exerted on the fabric and the juncture points disposed in rows generally aligned with the other threads converging a substantial amount in relation to each other thus extending the interstices in the general direction of such pull and contracting the interstices transversely thereto to effectively deform said fabric without materially stretching the threads; and a suitable settable material having the inherent property of workability for a time when treated with certain liquid and then setting to rigid state, carried by said fabric, said settable material prior to the use of the article normally preventing the deformation of the fabric, whereby during the workable stage of said settable material when treated, said material moves with said threads and juncture points and is therewith conformable to an irregular object about which said article is to be formed into a cast or mold and subsequent to the conformation thereof sets to a rigid state retaining that conformation.

5. A cast or mold forming article, comprising, in combination, a fabric having certain threads in coacting relationship with other threads which intersect said certain threads at juncture points defining open interstices therebetween with the distance between adjacent juncture points along any thread being greater than the diameter of any of the threads, the interstices being extensible a substantial amount in the general direction of a pull exerted on the fabric and contractible transversely thereto to effectively deform said fabric without materially stretching the threads; and a suitable settable material having the inherent property of workability for a time when treated with certain liquid and then setting to rigid state, carried by said fabric, said settable material prior to the use of the article normally preventing the deformation of the fabric, whereby during the workable stage of said settable material when treated, said material moves with said threads and juncture points and is therewith conformable to an irregular object about which said article is to be formed into a cast or mold and subsequent to the conformation thereof sets to a rigid state retaining that conformation.

6. The article defined in accordance with the structure set forth in claim 5 wherein the juncture points which are disposed in rows generally aligned to such pull exerted on the fabric separate a substantial amount in relation to each other in response to such pull and the juncture points which are disposed in rows generally transversely aligned to such pull converge a substantial amount in relation to each other thus causing the extensibility and contractibility of the interstices.

7. The article defined in accordance with the structure set forth in claim 5 wherein the juncture points which are disposed in rows generally aligned with said certain threads separate a substantial amount in relation to each other in response to such pull exerted on the fabric and the juncture points disposed in rows generally aligned with the other threads converge a substantial amount in relation to each other thus causing the extensibility and contractibility of the interstices.

8. The article of claim 5 in which said fabric is loosely knit cloth.

9. The article of claim 5 in which said fabric is loose open net material disposed on a bias.

10. The article of claim 5 in which said fabric is loosely woven cloth.

11. The article of claim 5 wherein said settable material is plaster of Paris.

12. The article of claim 5 wherein said threads are covered by a generally waterproof coating and stiffening sizing material, whereby their ability to respond to pull is substantially unaffected in the presence of water and drying of the cast is not delayed by wet threads.

13. The article of claim 5 wherein said threads are coated with paraffin.

14. The article of claim 5 in which on one side of said cast or mold forming article there is an extensible compressible lining free from and serving as a barrier to said settable material, said lining being an integral part of said article adhered to the remaining parts and in place before application of said article to form an actual cast or mold.

15. The article of claim 5 in which the cloth threads are disposed in said article with the juncture points aligned along one direction in a substantially fully extended position to their maximum distance apart, said settable material in its dry shape holding said juncture points against movement, so that when said settable material is treated with said liquid said article responds substantially only to pull in the direction generally transverse to said one direction.

16. The article of claim 15 wherein the stated disposition of said threads comprises a pre-stretching of said fabric in said one direction.

17. The article of claim 5 wherein there are a plurality of layers of said fabric.

18. The article of claim 17 wherein some of said layers are loosely knit cloth and some of said layers are coarse netting, said netting being placed on a bias relative to said knit cloth.

19. The article of claim 5 in which a plurality of inextensible members are incorporated thereinto along one direction to limit said stretch in said one direction.

20. The article of claim 5 in which the threads are disposed in said fabric with the juncture points aligned along one direction spaced considerably more closely together than the juncture points aligned in a direction generally transverse thereto, so that potential stretch during the workable stage is greater in said transverse direction than in said one direction.

21. The article of claim 5 wherein said fabric comprises an open cloth tube through which the object to be molded or cast is inserted.

22. The article of claim 5 in which on one side of said cast or mold forming article there is an extensible, compressible lining serving as a barrier to said settable material, said lining being an integral part of said article.

23. A prefabricated article for forming casts and molds, said article comprising, in combination, a plurality of superimposed concentrically disposed seamless, tubular layers of loosely knit elastic cloth, each layer of cloth being formed of intercoupled elastic threads in coacting relationship with each other, with certain threads intersecting other threads at juncture points forming oblique angles and defining open interstices therebetween, with the distance between adjacent juncture points along any thread being greater than the diameter of any of the threads, so that when pulled the layers of cloth can deform without stretching the intercoupled threads, as well as by stretching the threads, by having the juncture points which are generally aligned to the direction of pull separating a substantial amount in relation to each other and the juncture points which are generally aligned transversely to the direction of pull converging a substantial amount in relation to each other, said cloth being extendable at least 25% in each direction, said threads being coated with paraffin, and plaster of Paris carried by each layer, whereby when said article is moistened, said plaster of Paris first becomes workable and then sets to a rigid form, and, while workable, said article can be extended widthwise and placed as a tube around a solid body that extends through said tube and can then be extended lengthwise to fit snugly around said body, a smooth and even conformation being obtained by working the moistened article into shape by virtue of the deformable nature in every portion thereof and by virtue of its ability to hold a shape to which it is deformed without being under substantial tension.

24. A prefabricated article for forming casts and molds, said article comprising, in combination, a plurality of superimposed concentrically disposed tubular layers of loosely knit cloth, each layer of cloth having elastic threads with certain threads in coacting relationship with other threads which intersect said certain threads at juncture points defining open interstices therebetween with the distance between adjacent juncture points along any thread being greater than the diameter of any of the threads, the threads being slidable on each other at the juncture points so that when pulled the layers of cloth can deform both by stretching the threads and without stretching the threads by having the juncture points which are generally aligned to the direction of pull separating a substantial amount in relation to each other and the juncture points which are generally aligned transversely to the direction of pull converging a substantial amount in reaction to each other by virtue of their sliding, said cloth being extendable in this manner at least 25% in each direction from a neutral position, and plaster of Paris carried by said layers, whereby when said article is moistened, said plaster of Paris first becomes workable and then sets to a rigid form, and, while workable, said article can be extended widthwise and placed as a tube around a solid body that extends through said tube and can then be extended lengthwise to contract widthwise and fit snugly around said body, a smooth and even conformation being obtained by working the moistened article into shape by virtue of the deformable nature in every portion thereof and by virtue of the ability to hold a deformed shape without being under substantial tension.

25. A prefabricated article for forming casts and molds, said article comprising, in combination, at least one layer of loosely constituted cloth, each layer being formed of intercoupled elastic threads in coacting relationship with each other with certain threads intersecting other threads at juncture points and defining open interstices therebetween with the distance between adjacent juncture points along any thread being greater than the diameter of any of the threads, so that when pulled the cloth can deform both by the threads stretching and without substantially stretching the individual threads, by having the juncture points generally aligned to the direction of pull separating a substantial amount in relation to each other and juncture points generally aligned transversely to the direction of pull converging a substantial amount in relation to each other, said cloth being extendable at least 25% in each said direction from a neutral position; and settable material carried by each layer, whereby when said article is in a wet state, said settable material is workable and when dry sets to a rigid form, and, while workable, said article can be deformed in either said direction and conformed to a body by said deformation to fit snugly thereon, a smooth and even conformation being obtained by working the moistened article into shape by virtue of the deformable nature in every portion thereof and by virtue of the ability to hold such deformed shape without being under substantial tension.

26. An article for making casts and molds, including in combination: a shaped skeleton comprising a plurality of layers of loosely-constituted thread-type cloth, at least one layer comprising loose netting disposed on a bias with respect to its edges, and cloth having elastic threads capable of substantial distortion, said cloth thereby being arranged for a substantial amount of extension along its major, mutually perpendicular dimensions, some of the layers being of one material and some of another material; and cast-forming material supported by said cloth layers between them and upon their threads.

27. The article of claim 26 in which at least one layer is partially prestretched in one direction so as to limit the remaining stretch available in the cast or mold.

28. The article of claim 26 in which some areas on one side of said article incorporate padding material secured to at least one layer of said cloth, said cloth being adapted for direct contact with the skin of a person to which the article may be applied and the padding material being on the other side thereof, said padding material being stretchable to substantially the same degree as said skeleton.

29. The article of claim 28 in which the protective padding material consists of a large number of separate pieces of padding material enmeshed in said netting.

30. The article of claim 28 in which the protective padding material consists of at least one layer of elastic resilient soft material.

31. The article of claim 28 in which the protective padding material consists of a stretchable sheet of absorbent cellulose.

32. The article of claim 31 in which said stretchable sheet and the netting retaining it have been pre-stretched in one direction, so that the possible stretch in that direction is limited.

33. The article of claim 28 in which the padding material is covered by a waterproof coating.

34. The article of claim 28 in which said padding material is disposed over both sides and all edges of the article, so that it serves not only as padding to the part contained in the cast but protects outside body parts and other things that may come in contact therewith and also prevents stickiness on the surface during application.

35. The article of claim 34 in which said padding is coated with a waterproof material over one side only thereof.

36. A method for firmly affixing plaster of Paris to fabric to make a cast-and-mold-forming material adapted for storage and becoming pliable upon the application of water and later setting, without any foreign material remaining as a binder comprising the steps of: mixing only plaster of Paris, water, and a fully volatile retarding agent in sufficient concentration so that the plaster of Paris will only partially set between the time of mixture and drying; applying said mixture to said fabric; and drying the coated fabric under enough heat to convert the partially set portion of the plaster of Paris back into plaster of Paris, said portion acting as a binder before and after it is converted back to plaster of Paris, the retarding agent being evaporated by said heat.

37. A method for securely affixing plaster of Paris to fabric to make a cast-and-mold-forming material that is adapted for storage and becomes pliable and workable upon the application of water until it sets, without any foreign material remaining as a binder, comprising: mixing only powdered gypsum in a major proportion, unset plaster of Paris in a lesser proportion than said gypsum, water, and a retarding agent; applying said mixture to said fabric; setting said plaster of Paris; and heating the resultant article to convert the gypsum and reconvert the set plaster of Paris back to plaster of Paris.

38. A method of producing a prefabricated cast material adapted for making surgical casts and molds upon the addition of water, which makes the material first pliable and causes it to set later, comprising the steps of mixing only powdered plaster of Paris, a powdered melamine resin, and a powdered catalyst; adding isopropyl alcohol containing a small percentage of water, to make a semi-fluid paste; applying said semi-fluid paste to a fabric base, and drying said paste on said fabric so that it adheres to said fabric, and is bound thereto for easy handling and also for improved wetting.

39. A method of producing a cast material adapted for making surgical casts and molds upon the addition of water, which makes the material first pliable and causes it to set later, comprising the steps of thoroughly mixing only finely powdered plaster of Paris, melamine resin and a suitable catalyst; adding sufficient anhydrous isopropyl alcohol to make a thin suspension, agitating said suspension thoroughly; spreading it upon fabric; and evaporating the isopropyl alcohol slowly in an atmosphere with a very high humidity so that the material is bound to the fabric for easy handling and also for easy wetting.

40. An article for making casts and molds, including in combination: a plurality of layers of cloth, comprising netting placed on a bias, the distance between threads in said cloth being sufficient to give a distortion of more than 25% from normal in both major directions, from the undistorted position, extension in one direction being recoverable to its original position by extending it in the direction where contraction formerly took place; and by plaster of Paris supported by each said layer and between said layers, some of said plaster of Paris in between layers including therewith a powdered melamine resin and a catalyst for reaction therewith.

41. A cast or mold forming article, comprising, in combination, a fabric having certain threads in coacting relationship with other threads which intersect said certain threads at juncture points defining open interstices therebetween with the distance between adjacent juncture points along any thread being greater than the diameter of any of the threads, the interstices being extensible a substantial amount in the general direction of a pull exerted on the fabric and contractible transversely thereto to effectively deform said fabric without materially stretching the threads; a suitable settable material having the inherent property of workability for a time when treated with certain liquid and then setting to rigid state, carried by some areas on one side of said fabric, said settable material prior to the use of the article normally preventing the deformation of the fabric, whereby during the workable stage of said settable material when treated, said material moves with said threads and juncture points and is therewith conformable to an irregular object about which said article is to be formed into a cast or mold and subsequent to the conformation thereof sets to a rigid state retaining that conformation; and an extensible, compressible material secured to some areas on said one side of said fabric, the other side of said fabric being adapted for direct contact with the skin of a person to whom the cast or mold may be applied and the compressible, extensible material being stretchable to substantially the same degree as the remainder of said cast or mold forming article when said article is in said workable stage.

42. The article of claim 41 in which the extensible, compressible material consists essentially of a large number of separate pieces enmeshed in said fabric.

43. The article of claim 41 in which said extensible, compressible material consists essentially of at least one layer of elastic resilient soft material.

44. The article of claim 41 in which said extensible, compressible material consists essentially of a stretchable sheet of absorbent cellulose.

45. The article of claim 44 in which said stretchable sheet and said fabric that retains said sheet have been pre-extended in one direction so that the possible extension in that direction is limited.

46. The article of claim 41 in which said extensible, compressible material is covered by waterproof coating.

47. The article of claim 41 in which said extensible, compressible material is disposed over both sides and all edges of the cast or mold forming article so that it not only serves as padding to the part contained in the cast but protects outside body parts and other things that may come into contact with the resultant cast or mold and also prevents stickiness on the surface during application of the cast or mold-forming article.

48. The article of claim 47 in which said extensible compressible material is coated with waterproof material over one side only of said cast or mold-forming article.

References Cited in the file of this patent

UNITED STATES PATENTS

| | | |
|---|---|---|
| 426,590 | Johnson | Apr. 29, 1890 |
| 937,478 | Sims | Oct. 19, 1909 |
| 1,250,818 | Dutard | Dec. 18, 1917 |
| 1,351,441 | Pond | Aug. 31, 1920 |
| 2,009,597 | Weber | July 30, 1935 |
| 2,103,942 | Gillin | Dec. 28, 1937 |
| 2,218,844 | Lovell | Oct. 22, 1940 |
| 2,282,274 | Weisswasser | May 5, 1942 |
| 2,489,252 | Anderson | Nov. 29, 1949 |
| 2,551,613 | Litchfield | May 8, 1951 |
| 2,571,343 | Dailey | Oct. 16, 1951 |
| 2,593,742 | Friedman | Apr. 22, 1952 |
| 2,711,168 | Brickman et al. | June 21, 1955 |

FOREIGN PATENTS

| | | |
|---|---|---|
| 334,123 | Great Britain | Aug. 26, 1930 |